(12) United States Patent
Austrheim et al.

(10) Patent No.: US 11,866,259 B2
(45) Date of Patent: *Jan. 9, 2024

(54) MULTI BIN VEHICLE

(71) Applicant: Autostore Technology AS, Nedre Vats (NO)

(72) Inventors: Trond Austrheim, Etne (NO); Jørgen Djuve Heggebø, Olen (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,487

(22) Filed: Jan. 27, 2023

(65) Prior Publication Data

US 2023/0166912 A1 Jun. 1, 2023

Related U.S. Application Data

(63) Continuation of application No. 16/765,563, filed as application No. PCT/EP2018/055275 on Mar. 5, 2018, now Pat. No. 11,591,160.

(30) Foreign Application Priority Data

Nov. 22, 2017 (NO) .................................. 20171863

(51) Int. Cl.
*B65G 1/04* (2006.01)
*B65G 1/137* (2006.01)
*B66F 9/18* (2006.01)

(52) U.S. Cl.
CPC ........... *B65G 1/137* (2013.01); *B65G 1/0464* (2013.01); *B65G 1/0478* (2013.01);
(Continued)

(58) Field of Classification Search
CPC ................................................... B65G 1/0464
See application file for complete search history.

(56) References Cited

U.S. PATENT DOCUMENTS 3,593,869 A 7/1971 Zurheide et al.
10,442,621 B2 * 10/2019 Bestic ................ B65D 81/2015
(Continued)

FOREIGN PATENT DOCUMENTS

CN 102054725 A 5/2011
EP 1359101 A2 11/2003
(Continued)

OTHER PUBLICATIONS

Office Action issued in Chinese Application No. 2018800755440; dated Mar. 25, 2021 (10 pages).
(Continued)

*Primary Examiner* — Mark C Hageman
(74) *Attorney, Agent, or Firm* — Osha Bergman Watanabe & Burton LLP

(57) ABSTRACT

A container-handling vehicle picks up storage containers from a three-dimensional grid of an underlying storage system. The container-handling vehicle has a vehicle body and wheels for moving the vehicle in two perpendicular directions on the grid. The vehicle body surrounds a cavity within which at least a first lifting device and a second lifting device are positioned adjacent to each other. Each lifting device is independently controlled and arranged to lift a storage container from the grid and into the cavity. The vehicle includes at least one vertical frame guiding element arranged inside the cavity. The frame guiding element extends between the lifting devices.

12 Claims, 13 Drawing Sheets

(52) U.S. Cl.
CPC ............ *B65G 1/0492* (2013.01); *B66F 9/186* (2013.01); *B65G 2201/0235* (2013.01); *B65G 2814/02* (2013.01); *B65G 2814/0313* (2013.01)

(56) References Cited

U.S. PATENT DOCUMENTS

| 10,759,597 | B2 | 9/2020 | Lindbo et al. | |
| 11,345,543 | B2* | 5/2022 | Lindbo | B65G 1/0464 |
| 2017/0305668 | A1 | 10/2017 | Bestic et al. | |
| 2019/0225436 | A1 | 7/2019 | Indbo et al. | |

FOREIGN PATENT DOCUMENTS

| GB | 2544650 | A | 5/2017 |
| JP | 2000188319 | A | 7/2000 |
| JP | 2002-362737 | A | 12/2002 |
| JP | 2015-208837 | A | 11/2015 |
| JP | 2015189523 | A | 11/2015 |
| JP | 2017-019579 | A | 1/2017 |
| NO | 317366 | B1 | 10/2004 |
| WO | 2013/167907 | A1 | 11/2013 |
| WO | 2014/090684 | A1 | 6/2014 |
| WO | 2015/193278 | A1 | 12/2015 |
| WO | 2015/197709 | A1 | 12/2015 |
| WO | 2016063197 | A1 | 4/2016 |
| WO | 2017/037095 | A1 | 3/2017 |
| WO | 2017081275 | A1 | 5/2017 |
| WO | 2017/129384 | A1 | 8/2017 |
| WO | 2017153583 | A1 | 9/2017 |
| WO | 2018/060527 | A1 | 4/2018 |

OTHER PUBLICATIONS

English Translation of Office Action in counterpart Japanese Patent Application No. 2020-528136 dated Apr. 20, 2022 (6 pages).
International Search Report issued in PCT/EP2018/055275 dated Aug. 20, 2018 (5 pages).
Written Opinion of the International Searching Authority issued in PCT/EP2018/055275 dated Aug. 20, 2018 (10 pages).
Norwegian Search Report issued in NO 20171863 dated Jun. 22, 2018 (2 pages).

* cited by examiner

MULTI BIN VEHICLE

TECHNICAL FIELD

The present invention relates to automated storage systems, a container-handling vehicle for use in such storage systems, as well as methods for use of the container-handling vehicle in such storage systems.

BACKGROUND

The Applicant's already known AutoStore system is a storage system comprising a three-dimensional storage grid structure wherein storage containers/containers are stacked on top of each other to a certain height. Such a prior art system is shown in FIG. 1. The storage system is disclosed in detail in for instance NO317366 and WO 2014/090684 A1.

FIG. 1 discloses a framework structure of a typical prior art automated storage and retrieval system 1 and FIGS. 2a and 2b disclose known container-handling vehicles of such a system.

The framework structure includes a plurality of upright members/profiles 2 and a plurality of horizontal members 3, which are supported by the upright members 2. The members 2, 3 may typically be made of metal, e.g., extruded aluminium profiles.

The framework structure defines a storage grid 4 comprising multiple grid columns 12 arranged in rows. A majority of the grid columns 12 are storage columns 5 in which storage containers 6, also known as containers, are stacked one on top of another to form stacks 7. Each storage container 6 (or container for short) may typically hold a plurality of product items (not shown), and the product items within a storage container 6 may be identical, or may be of different product types, depending on the application. The framework structure guards against horizontal movement of the stacks 7 of storage containers 6, and guides vertical movement of the containers 6, but does normally not otherwise support the storage containers 6 when stacked.

A horizontal rail system 8 is arranged in a grid pattern across the top of the grid columns 12, on which rail system 8 a plurality of container-handling vehicles 9 are operated to raise storage containers 6 from and lower storage containers 6 into the storage columns 5, and also to transport the storage containers 6 above the storage columns 5. The rail system 8 includes a first set of parallel rails 10 arranged to guide movement of the container-handling vehicles 9 in a first direction X across the top of the frame structure 1, and a second set of parallel rails 11 arranged perpendicular to the first set of rails 10 to guide movement of the container-handling vehicles 9 in a second direction Y, which is perpendicular to the first direction X, see FIG. 3. In this way, the rail system 8 defines an upper end of the storage columns 5, above which the container-handling vehicles 9 can move laterally above the storage columns 5, i.e., in a plane, which is parallel to the horizontal X-Y plane.

Each container-handling vehicle 9 includes a vehicle body 13 and first and second sets of wheels 14, 15 which enable the lateral movement of the container-handling vehicle 9, i.e., the movement in the X and Y directions. In FIG. 2, two wheels in each set are visible. The first set of wheels 14 is arranged to engage with two adjacent rails of the first set 10 of rails, and the second set of wheels 15 arranged to engage with two adjacent rails of the second set 11 of rails. One of the set of wheels 14, 15 can be lifted and lowered, so that the first set of wheels 14 and/or the second set of wheels 15 can be engaged with their respective set of rails 10, 11 at any one time.

Each container-handling vehicle 9 also includes a lifting device 18 (not shown in FIGS. 1 and 2a, but visible in FIG. 2b) for vertical transportation of storage containers 6, e.g., raising a storage container 6 from and lowering a storage container 6 into a storage column 5. The lifting device 18 includes a lifting frame (not shown in FIG. 2a, but similar to the one shown in FIG. 2b labelled 17) which is adapted to engage a storage container 6, which lifting frame can be lowered from the vehicle body 13 so that the position of the lifting frame with respect to the vehicle body 13 can be adjusted in a third direction Z, which is orthogonal the first direction X and the second direction Y.

Conventionally, and for the purpose of this application, Z=1 identifies the uppermost layer of the grid 4, i.e., the layer immediately below the rail system 8 (in the present application, the rail system 8 is termed the top level of the grid), Z=2 is the second layer below the rail system 8, Z=3 is the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 6' in FIG. 1 can be said to occupy grid location or cell X=10, Y=2, Z=3. The container-handling vehicles 9 can be said to travel in layer Z=0 and each grid column 12 can be identified by its X and Y coordinates.

Each container-handling vehicle 9 includes a storage compartment or space for receiving and stowing a storage container 6 when transporting the storage container 6 across the grid 4. The storage space may comprise a cavity 21 arranged centrally within the vehicle body 13, e.g., as is described in WO2014/090684A1, the contents of which are incorporated herein by reference, and as shown in FIG. 2a.

Alternatively, the container-handling vehicles may have a cantilever construction, as is described in NO317366, the contents of which are also incorporated herein by reference, and as shown in FIG. 2b.

The container-handling vehicles 9 may have a footprint F, i.e., a horizontal periphery in the X and Y directions (see FIG. 4), which is generally equal to the lateral or horizontal extent of the rails, see FIG. 4, surrounding the open end of a single grid column 12, i.e., slightly larger than the periphery/circumference of a grid column 12 in the X and Y directions, e.g., as described in WO2015/193278A1, the contents of which are incorporated herein by reference. Alternatively, the container-handling vehicles 9 may have a footprint which is larger than the lateral extent of the rails surrounding a single grid column 12, e.g., as disclosed in WO2014/090684A1.

The rail system 8 may be a single-track system, as shown in FIG. 3. Preferably, the rail system 8 is a double-track system, as shown in FIG. 4, thus allowing a container-handling vehicle 9 having a footprint F generally corresponding to the rails surrounding a grid column 12 to travel along a row of grid columns in either an X or Y direction even if another container-handling vehicle 9 is positioned above a grid column 12 adjacent to that row.

In a storage grid, a majority of the grid columns 12 are storage columns 5, i.e., grid columns where storage containers are stored in stacks. However, a grid normally has at least one grid column 12 which is used not for storing storage containers, but which includes a location where the container-handling vehicles can drop off and/or pick up storage containers so that they can be transported to an access station where the storage containers 6 can be accessed from outside of the grid or transferred out of or into the grid, i.e., a container handling station. Within the art, such a location is normally referred to as a "port" and the grid column in which the port is located may be referred to as a port column.

The grid 4 in FIG. 1 includes two port columns 19 and 20. The first port column 19 may for example be a dedicated drop-off port column where the container-handling vehicles 9 can drop off storage containers to be transported to an access or a transfer station (not shown), and the second port 20 column may be a dedicated pick-up port column where the container-handling vehicles 9 can pick up storage containers that have been transported to the grid 4 from an access or a transfer station.

When a storage container 6 stored in the grid 4 disclosed in FIG. 1 is to be accessed, one of the container-handling vehicles 9 is instructed to retrieve the target storage container from its position in the grid 4 and transport it to the drop-off port 19. This operation involves moving the container-handling vehicle 9 to a grid location above the storage column 5 in which the target storage container is positioned, retrieving the storage container 6 from the storage column 5 using the container-handling vehicle's lifting device (not shown in the prior art central cavity robot shown in FIG. 2a, but normally similar to the lifting device 18 of the prior art vehicle of FIG. 2b), and transporting the storage container to the drop-off port 19. The prior art vehicle 9 shown in FIG. 2b better illustrates the general design of the lifting device. Details of this prior art vehicle 9 (often referred to as a cantilever robot) are described in the Norwegian patent NO317366. The lifting devices 18 of both prior art vehicles 9 comprise a set of lifting bands 16 connected close to the corners of a lifting frame 17 (may also be termed a gripping device) for releasable connection to a storage container. To raise or lower the lifting frame 17 (and optionally a connected storage container 6), the lifting bands 16 are spooled on/off at least one rotating lifting shaft or drum (not shown) arranged in the container-handling vehicle. Various designs of the at least one lifting shaft are described in for instance WO2015/193278 A1 and WO2017/129384 A1. The lifting frame 17 features container connecting elements 24 for releasably connecting to a storage container, and guiding pins 30. If the target storage container is located deep within a stack 7, i.e., with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container-handling vehicle that is subsequently used for transporting the target storage container to the drop-off port 19, or with one or a plurality of other cooperating container-handling vehicles. Alternatively, or in addition, the automated storage and retrieval system may have container-handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

When a storage container 6 is to be stored in the grid 4, one of the container-handling vehicles 9 is instructed to pick up the storage container from the pick-up port 20 and transport it to a grid location above the storage column 5 where it is to be stored. After any storage containers positioned at or above the target position within the storage column stack have been removed, the container-handling vehicle 9 positions the storage container at the desired position. The removed storage containers may then be lowered back into the storage column, or relocated to other storage columns.

For monitoring and controlling the automated storage and retrieval system, e.g., monitoring and controlling the location of respective storage containers within the grid 4, the content of each storage container 6 and the movement of the container-handling vehicles 9 so that a desired storage container can be delivered to the desired location at the desired time without the container-handling vehicles 9 colliding with each other, the automated storage and retrieval system includes a control system, which typically is computerised and includes a database for keeping track of the storage containers.

The prior art container-handling vehicles 9 described above may handle and transport only one container 6 in each operation, thereby setting a limitation on the efficiency of certain operations performed by the storage system, including retrieval and/or storage of multiple storage containers and "digging".

A container-handling vehicle able to retrieve multiple storage containers from the same storage column is disclosed in WO2013167907. However, the disclosed container-handling vehicle suffers from low stability putting restrictions on its speed and acceleration.

In view of the above, it is desirable to provide a more efficient container-handling vehicle, an automated storage and retrieval system including said container-handling vehicle, and a method for operating such a system. In particular, the present invention provides a container-handling vehicle having an improved operational speed in various situations relative the prior art vehicles.

SUMMARY OF THE INVENTION

The present invention is defined in the attached claims and in the following:

In a first aspect, the present invention provides a container-handling vehicle for picking up storage containers from a three-dimensional grid of an underlying storage system, including
 a first set of wheels arranged at opposite sides of a vehicle body, for moving the vehicle along a first direction (i.e., a first horizontal direction) on the grid;
 a second set of wheels arranged at opposite sides of the vehicle body, for moving the vehicle along a second direction (i.e., a second horizontal direction) on the grid, the second direction being perpendicular to the first direction; and
 the first set of wheels displaceable in a vertical direction between a first position, wherein the first set of wheels allow movement of the vehicle along the first direction, and a second position, wherein the second set of wheels allow movement of the vehicle along the second direction, wherein
 the vehicle body surrounds a cavity within which at least a first lifting device and a second lifting device are positioned adjacent to each other, each lifting device is independently controlled and arranged to lift a storage container from the grid and into the cavity, such that a bottom of the storage container is at a level above the lowest level of the second set of wheels. Each lifting device is also able to lower a storage container from the cavity and into the grid.

The first and the second lifting devices are adjacent such that the container-handling vehicle may accommodate two adjacent storage containers within the cavity.

When the first lifting device and the second lifting device are independently controlled, the first lifting device is controlled independently of the second lifting device. That is, one of the lifting devices may independently perform an operation, for instance lifting a storage container from a first storage column, while the other lifting device is performing another or similar operation, for instance returning a storage container to a second storage column adjacent to the first storage column.

In an embodiment of the container-handling vehicle, the first lifting device and the second lifting device is connected to at least one first rotatable lifting shaft (or a first set of lifting shafts) and at least one second rotatable lifting shaft (or a second set of lifting shafts), respectively. The lifting shafts are arranged at an upper level within the vehicle, i.e., at a level above the cavity or at an upper level within the cavity. Each lifting device is connected to the corresponding lifting shaft(s) via a set of lifting bands, or alternatively, includes a set of lifting bands connected to the corresponding lifting shaft(s). The rotation of each lifting shaft, or set of lifting shafts, is independently controlled, such that the connected lifting device may be raised or lowered independent of the other lifting devices.

In an embodiment of the container-handling vehicle, each of the at least first lifting device and second lifting device includes a lifting frame for releasably connecting to a container. The lifting frames of the at least first lifting device and second lifting device are adjacent.

In one embodiment, the container-handling vehicle includes a third lifting device arranged adjacent to the first or the second lifting device. The third lifting device may advantageously comprise any of the features disclosed for the first and second lifting device, e.g., being connected to at least one third rotatable lifting shaft and including a lifting frame.

In one embodiment, the container-handling vehicle includes a fourth lifting device arranged adjacent to the third lifting devices and the first or the second lifting device. The fourth lifting device may advantageously comprise any of the features disclosed for the first and second lifting device, e.g., being connected to at least one fourth rotatable lifting shaft and including a lifting frame.

In one embodiment, the container-handling device includes multiple adjacent rows of lifting devices, each row including at least two adjacent lifting devices, i.e., at least a first and a second lifting device, and each lifting device including any of the features disclosed for the first and second lifting device, e.g., each being connected to at least one rotatable lifting shaft and including a lifting frame. Each lifting device is controlled independently of the other lifting device(s). In one embodiment, a first row may comprise at least a first and second lifting device, and a second adjacent row may comprise at least a third and second lifting device, such that the first lifting device is adjacent the third lifting device and the second lifting device is adjacent the fourth lifting device.

In one embodiment, the container-handling vehicle includes a support beam connecting two opposite sides of a framework of the vehicle body, the support beam arranged in a horizontal position between two adjacent lifting devices or between two rows of lifting devices. The support beam is preferably arranged at a level above the lowermost level of the second set of wheels (or above the opening of the cavity) and below the level of the lifting devices when fully retracted into the cavity. The width of the support beam is smaller than, or equal to, the horizontal distance separating two adjacent lifting devices (alternatively separating the lifting frames of two adjacent lifting devices) or separating two adjacent rows of lifting devices (or alternatively separating the lifting frames of two adjacent rows of lifting devices).

In one embodiment, the container-handling vehicle includes at least one vertical frame guiding element (or frame guide) arranged inside the cavity. The frame guide extends between the adjacent lifting frames. In other words, the frame guide is arranged between the lifting frames of the at least first and second lifting device (i.e., the vertical frame guide is arranged between any adjacent lifting frames). The vertical frame guide is arranged such that lateral movement of the lifting frames, and consequently the lateral movement of any storage containers connected to the lifting frames, is restricted when entering the cavity and/or when inside the cavity. The frame guide may comprise at least one longitudinal plate or rib element arranged inside the cavity and extending at least partly between two adjacent lifting frames. The longitudinal plate or rib element may preferably extend in a vertical direction from a position at a lower level of the cavity, for instance at, or above, the level of the cavity opening, to a position at a level corresponding to, or above, an uppermost level of the lifting frame when inside the cavity. The frame guiding element(s) separates the cavity into multiple sections, each section sized to accommodate a storage container. The frame guiding element may be a part, preferably an integral part, of a framework of the vehicle body.

In a second aspect, the present invention provides an automated storage and retrieval system including a three-dimensional grid and at least one container-handling vehicle according to the first aspect, wherein the grid includes multiple storage columns, in which storage containers may be stored on top of one another in vertical stacks, and a port column for receiving and transporting a storage container to an access station; and the container handling vehicle is operated on rails at a top level of the grid for retrieving storage containers from, and storing storage containers in, the storage columns, and for transporting the storage containers horizontally across the grid; wherein the first lifting device and the second lifting device are arranged such that their respective lifting frames may enter two adjacent storage columns at the same time. In other words, the respective lifting frames may be centered relative to two adjacent storage columns at the same time.

In an embodiment of the automated storage and retrieval system, the at least one container-handling device includes a third and a fourth lifting device, the third and the fourth lifting device are arranged such that their respective lifting frames may enter two adjacent storage columns at the same time. In other words, the respective lifting frames may be centered relative to two adjacent storage columns at the same time. Each of the lifting frames of the third and fourth lifting device is preferably arranged to enter a storage column adjacent to one of the storage columns into which the lifting frame of the first or the second lifting device may enter In an embodiment of the automated storage and retrieval system, the lifting frames of the first lifting device and the second lifting device, i.e., the lifting frames of any two adjacent lifting devices, are horizontally separated by a distance being larger than, or equal to, the width of the rails separating two adjacent storage columns. That is, the respective lifting frames are separated by a distance which allows them to enter two adjacent storage columns at the same time.

In an embodiment of the automated storage and retrieval system, the container-handling vehicle has a horizontal periphery equal to, or less than, the horizontal periphery of a set of rails or the horizontal area delimited by the centreline of the set of rails, surrounding at least two adjacent storage columns or at least two adjacent rows of storage columns. In a storage system including a dual track rail system, the horizontal periphery of the container-handling vehicle is equal to or slightly less than the horizontal area delimited by the centreline of a set of rails surrounding two adjacent storage columns, i.e., such that a second container-handling vehicle according to the first aspect may be arranged above any of the storage columns surrounding the two adjacent storage columns or the at least two adjacent rows of storage columns, above which the first container handling vehicle is arranged.

Preferably, each of the storage columns has a rectangular cross-section, and the horizontal periphery of the container-handling vehicle is equal to, or less than, the horizontal periphery of a set of rails surrounding at least two storage columns adjacent at their long sides. In some embodiments, the horizontal periphery of the container-handling vehicle is equal to, or less than, the horizontal periphery of a set of rails surrounding at least two storage columns adjacent at their short sides.

In yet an embodiment of the automated storage and retrieval system, the container-handling vehicle has a horizontal periphery equal to, or less than, the horizontal periphery of a set of rails, or the horizontal area delimited by the centreline of the set of rails, surrounding multiple adjacent rows of storage columns, each row including at least two adjacent storage columns.

In an embodiment of the automated storage and retrieval system, each of the lifting frames includes container connecting elements for releasable connection to corresponding lifting frame connecting elements on a peripheral top section of the storage containers. Each lifting frame may also comprise guiding pins for ensuring a correct positioning of the container connecting elements.

In a third aspect, the present invention provides a method of retrieving at least one storage container from an automated storage and retrieval system. The automated storage and retrieval system may be a system according to the second aspect, or may comprise a three-dimensional grid and at least one container-handling vehicle, wherein the grid includes multiple storage columns, in which storage containers may be stored on top of one another in vertical stacks, and a port column for receiving and transporting a storage container to an access station; and the container handling vehicle is operated on rails at a top level of the grid for retrieving storage containers from, and storing storage containers in, the storage columns, and for transporting the storage containers horizontally across the grid; wherein the container-handling vehicle includes at least a first lifting device and a second lifting device arranged such that they may retrieve and/or store a storage container from/in at least two storage columns at the same time, preferably at least two adjacent storage columns.

The method includes the steps of:
identifying a first storage container to be retrieved, also denoted a target storage container;
moving the container-handling vehicle, such that the first lifting device is centred relative a first storage column including the first storage container;
retrieving a second storage container by the first lifting device, also denoted a non-target storage container, the second storage container arranged in the first storage column at a level above the first storage container;
moving the container-handling vehicle, such that the second lifting device is centred relative the first storage column; and
retrieving the first storage container by the second lifting device.

In an embodiment of the third aspect, the method further includes the step of:
storing the second storage container in a second storage column adjacent to the first storage column, preferably simultaneously with the step of retrieving the first container; or
returning the second storage container to the first storage column when the first storage container has been retrieved; or
storing the second storage container in a third storage column when the first storage container has been retrieved.

In an embodiment of the third aspect, the method includes a step of moving the container-handling vehicle along a pathway to the port column, and optionally delivering the first storage container to the port column for transfer out of the storage system.

The third storage column may for example be arranged along the pathway to the port column or along a pathway to a storage column containing a further target storage container to be retrieved.

In a fourth aspect, the present invention provides a method of retrieving at least one storage container from an automated storage and retrieval system. The automated storage and retrieval system may be a system according to the second aspect, or may comprise a three-dimensional grid and at least one container-handling vehicle, wherein the grid includes multiple storage columns, in which storage containers may be stored on top of one another in vertical stacks, and a port column for receiving and transporting a storage container to an access station; and the container handling vehicle is operated on rails at a top level of the grid for retrieving storage containers from, and storing storage containers in, the storage columns, and for transporting the storage containers horizontally across the grid; wherein the container-handling vehicle includes at least a first lifting device and a second lifting device arranged such that they may retrieve and/or store a storage container from/in at least two storage columns at the same time, preferably two adjacent storage columns.

The method of the fourth aspect includes the steps of:
identifying a first storage container to be retrieved, also denoted a target storage container;
moving the container-handling vehicle, such that the first lifting device is centred relative a first storage column including the first storage container;
retrieving a second storage container, also denoted a non-target storage container, by the first lifting device, the second storage container arranged in the first storage column at a level above the first storage container;
moving the container-handling vehicle, such that the second lifting device is centred relative the first storage column;
retrieving a further second storage container by the second lifting device;
storing any one of the second storage containers in a second storage column, preferably arranged adjacent to the first storage column;

moving the container-handling vehicle, such that the first or the second lifting device is centred relative the first storage column; and retrieving the first storage container by the first or second lifting device;

In an embodiment of the fourth aspect, the method includes a step of moving the container-handling vehicle along a pathway to the port column, and optionally delivering the first storage container to the port column for transfer out of the storage system.

In a fifth aspect, the present invention provides a method of retrieving at least one storage container from an automated storage and retrieval system. The automated storage and retrieval system may be a system according to the second aspect, or may comprise a three-dimensional grid and at least one first type and one second type of container-handling vehicle, wherein the grid includes multiple storage columns, in which storage containers may be stored on top of one another in vertical stacks, and a port column for receiving and transporting a storage container to an access station; and the first and second type of container handling vehicles are operated on rails at a top level of the grid for retrieving storage containers from, and storing storage containers in, the storage columns, and for transporting the storage containers horizontally across the grid; wherein the first type of container-handling vehicle includes multiple lifting device arranged such that they may independently retrieve and/or store a storage container from/in multiple storage columns at the same time. The second type of container-handling vehicle may advantageously comprise a single lifting device similar to one of the multiple lifting devices of the first type of container-handling vehicle.

The method of the fifth aspect includes the steps of:
a. identifying a first storage container, also denoted a target container, to be retrieved;
b. moving the first type of container-handling vehicle, such that one of the multiple lifting devices (i.e., one of the multiple lifting devices not currently lifting a storage container) is centred relative a first storage column including the first storage container;
c. retrieving a second storage container, also denoted a non-target container, by the lifting device centred relative the first storage column, the second storage container arranged in the first storage column at a level above the first storage container;
d. repeating steps b and c until no second storage containers, i.e., no non-target containers, are at a level above the first storage container; and
e. retrieving the first storage container by a first or second type of container-handling vehicle.

In an embodiment of the fifth aspect, the method includes a step of storing a second storage container in a storage column other than the first storage column. In this manner an occupied lifting device is freed to retrieve a further second storage container from the first storage column. If the storage column is arranged adjacent to the first storage column, the step is preferably performed simultaneously to step c.

In one embodiment of the fifth aspect, the method includes a step, following step d, of moving the first type of vehicle away from the first storage column to provide one of the second type of container-handling vehicles access to the first storage container to perform step e.

In an embodiment of the fifth aspect, the second type of container-handling vehicle includes a single lifting device and is arranged to retrieve and transport the first storage container to a desired location, such as a port column or buffer zone. The second type of container-handling vehicle may for example be a prior art vehicle as illustrated in FIG. 2a or 2b.

SHORT DESCRIPTION OF THE DRAWINGS

Certain embodiments of the present invention will now be described in detail by way of example only and with reference to the following drawings.

In the drawings, like reference numbers have been used to indicate like parts, elements or features unless otherwise explicitly stated or implicitly understood from the context.

DETAILED DESCRIPTION OF THE INVENTION

Figure 1:
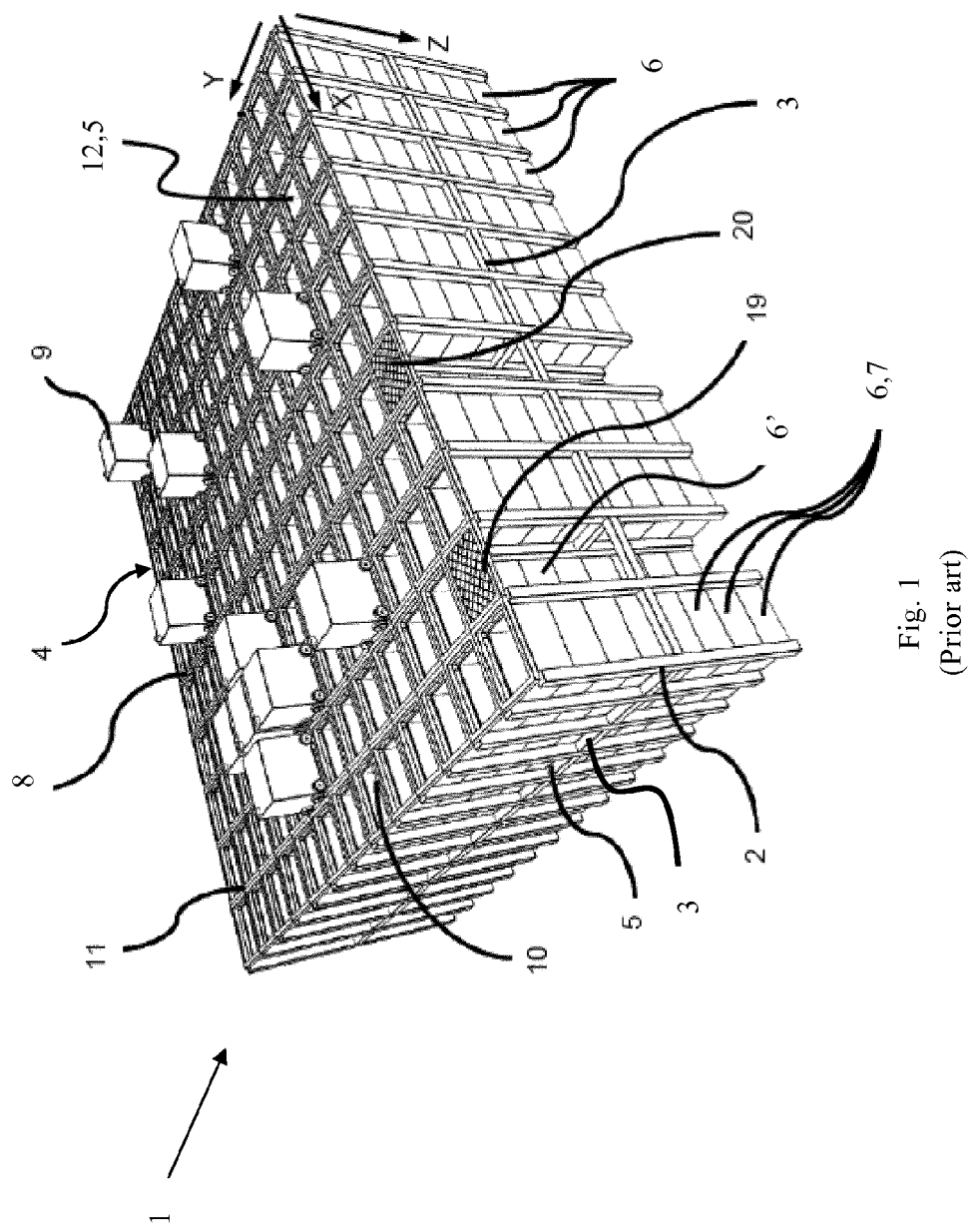
FIG. 1 is a perspective side view of a prior art storage and retrieval system.

In the following, embodiments of the invention will be discussed in more detail by way of example only and with reference to the appended drawings. It should be understood, however, that the drawings are not intended to limit the invention to the subject-matter depicted in the drawings.

Figure 2B:
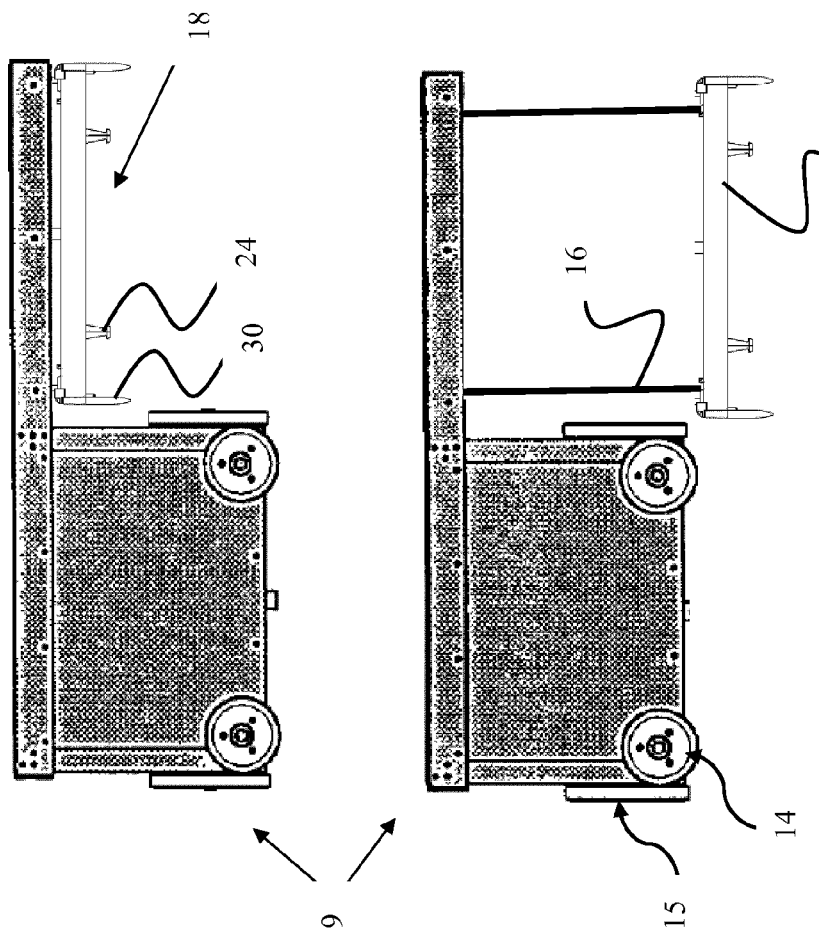
FIGS. 2a and 2b depict two different prior art container handling vehicles.
Figure 2A:
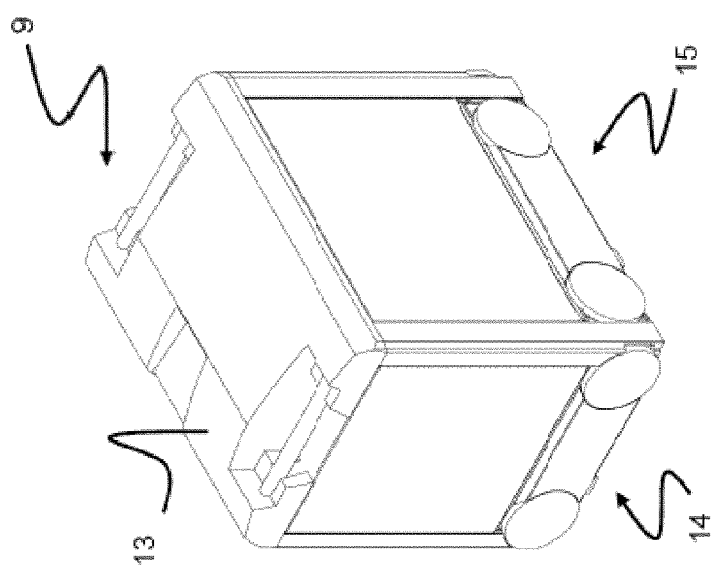

As mentioned above, a disadvantage of prior art container-handling vehicles 9, see FIGS. 2a and 2b, is their ability to handle only one container 6 at a time.

Figure 12:
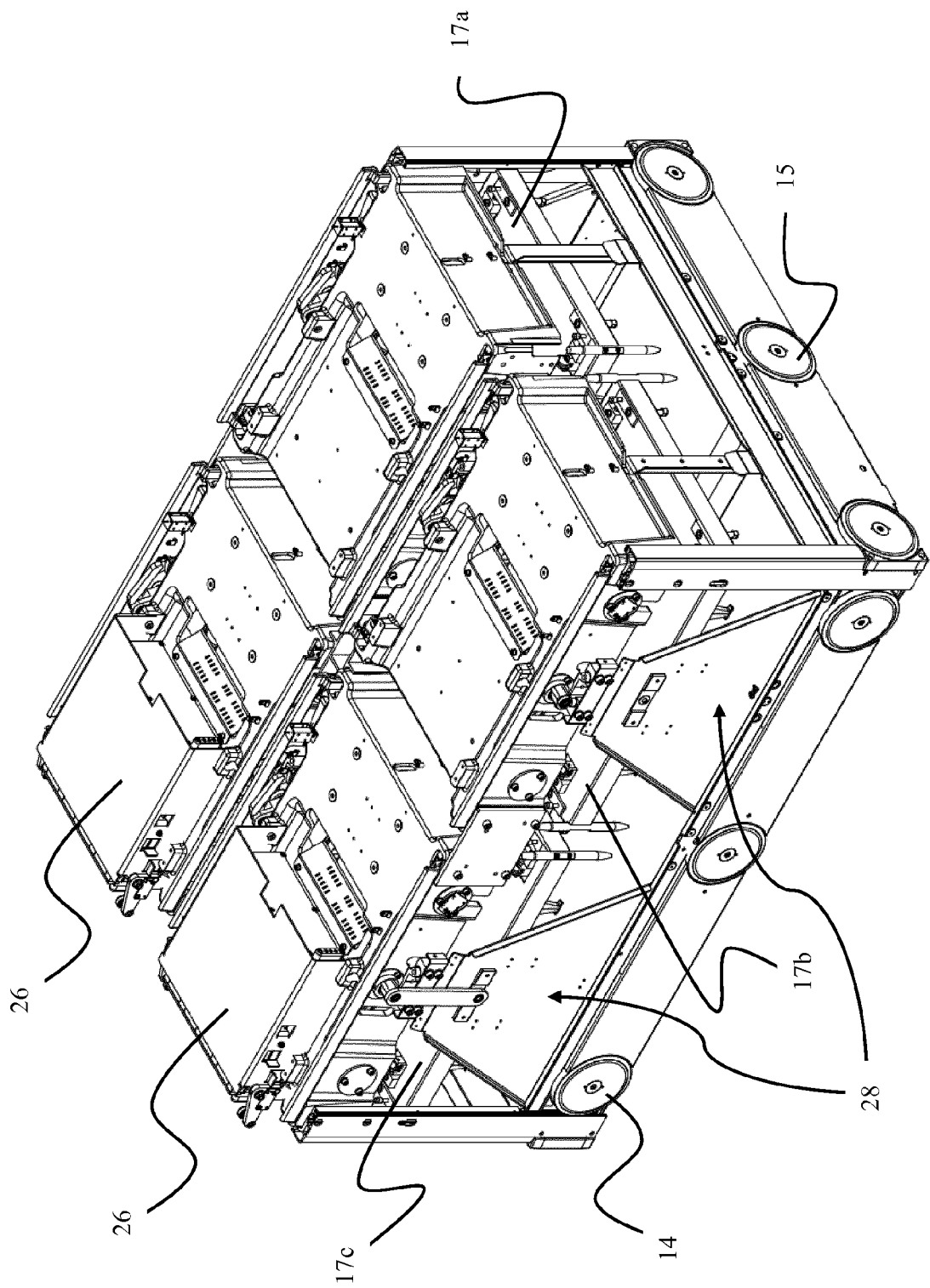
FIG. 12 is a perspective side view of the container-handling vehicle in FIG. 11, wherein the external panels are removed.

A first exemplary embodiment of a container-handling vehicle 27a according to the invention is shown in FIGS. 5-10. The inventive vehicle features a first set of wheels 14 arranged at opposite sides of a vehicle body 13, for moving the vehicle 27a on a rail system 8 along a first direction X on a grid 4 of a storage system 1, and a second set of wheels 15 arranged at opposite sides of the vehicle body 13, for moving the vehicle 27a along a second direction Y on the grid 4. The second direction Y is perpendicular to the first direction X. The first set of wheels 14 is displaceable in a vertical direction Z between a first position and a second position by being connected to a wheel displacement assembly 28 (not shown, see FIGS. 12 and 16). In the first position, the first set of wheels 14 is at a level below the second set of wheels 15 and in contact with the rail system, such that movement of the vehicle 27a along the first direction X is allowed, and in the second position the first set of wheels are vertically displaced away from the rail system to a level above the second set of wheels 15, such that the second set of wheels 15 is in contact with the rail system allowing movement of the vehicle 27a along the second direction Y. Structural details of suitable assemblies for providing displaceable sets of wheels are disclosed in for instance WO2015/193278 A1 and WO2017/153583, the contents of which are incorporated by reference, as well as in the second and third exemplary embodiments shown in FIGS. 11-16.

Figure 4:
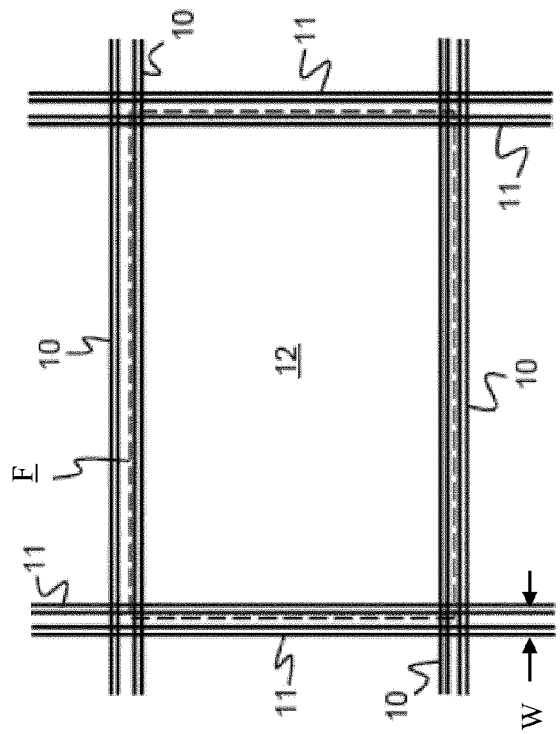
FIGS. 3 and 4 are top side schematic views of two types of rail systems for use in the storage system in FIG. 1.
Figure 3:
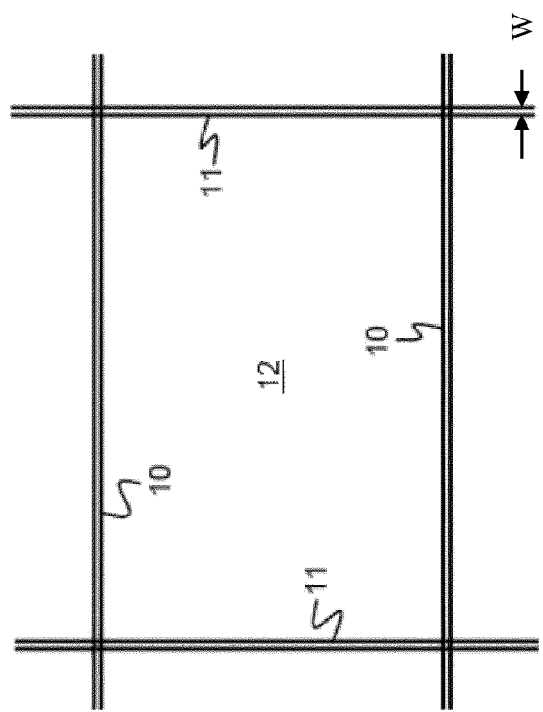
Figure 5:
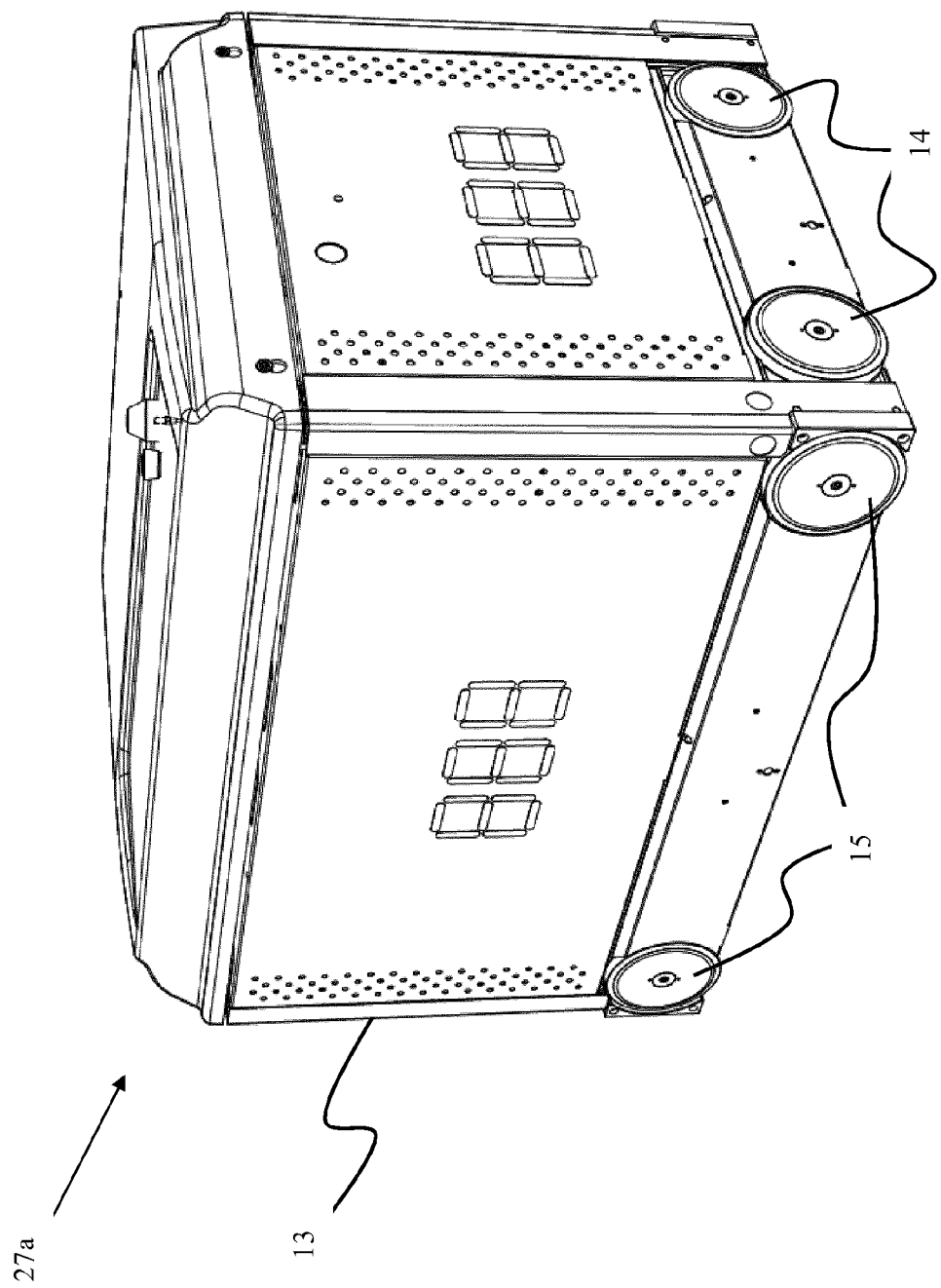
FIG. 5 is a perspective side view of a first exemplary embodiment of a container-handling vehicle according to the invention.
Figure 7:
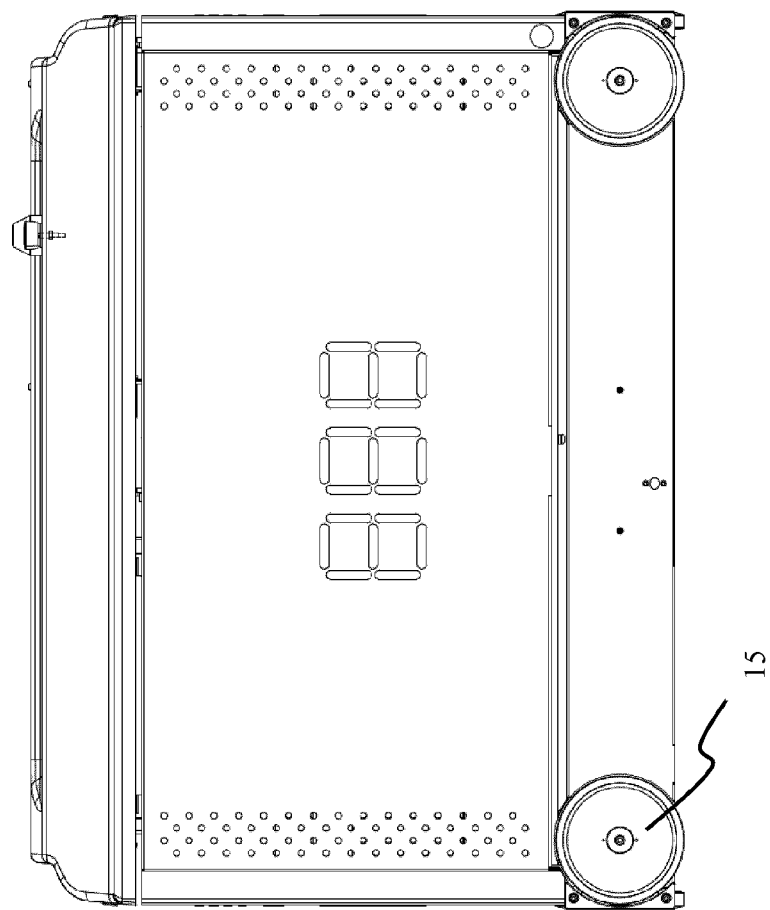
FIG. 7 is a side view of the container-handling vehicle in FIG. 5.
Figure 6:
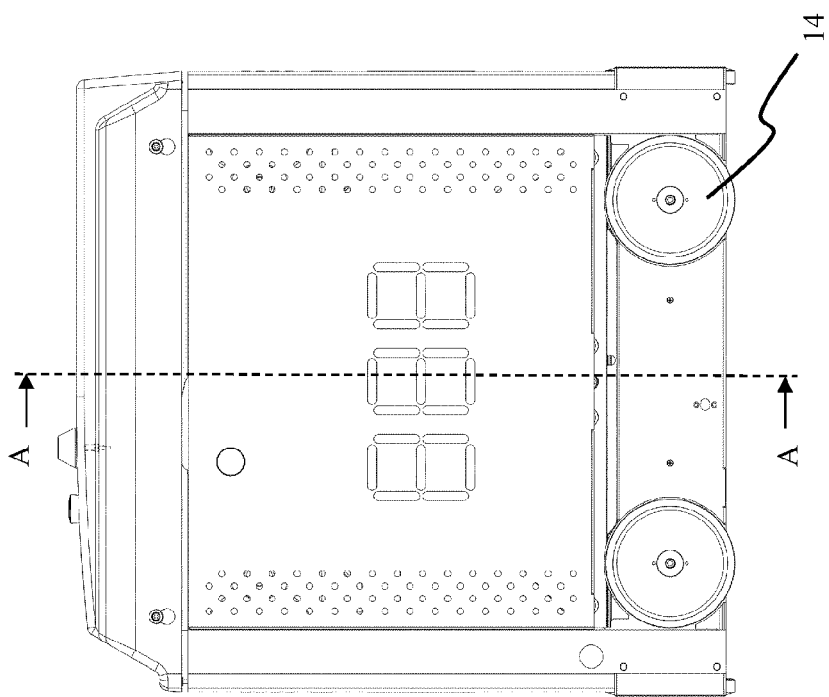
FIG. 6 is a side view of the container-handling vehicle in FIG. 5.

The vehicle body 13 surrounds a cavity 21 within which a first lifting device 18a and a second lifting device 18b are positioned adjacent to each other; the cavity being open at its underside to allow access from below. Each lifting device is arranged to lift a storage container 6 from the grid 4 of an underlying storage system 1 and into the cavity 21, and vice versa. By having two lifting devices arranged adjacent to each other, the inventive vehicle 27a may accommodate two adjacent storage containers within the cavity 21. When accommodated in the cavity, the bottom of each storage container is at a level above the lowest level of the second set of wheels 15. By being arranged above the lowest level of the second set of wheels 15, the bottom of the storage containers 6 will not interfere with the rail system 10,11 of the grid 4 during horizontal movement of the container-handling vehicle, see FIGS. 1, 3 and 4.

Figure 8:
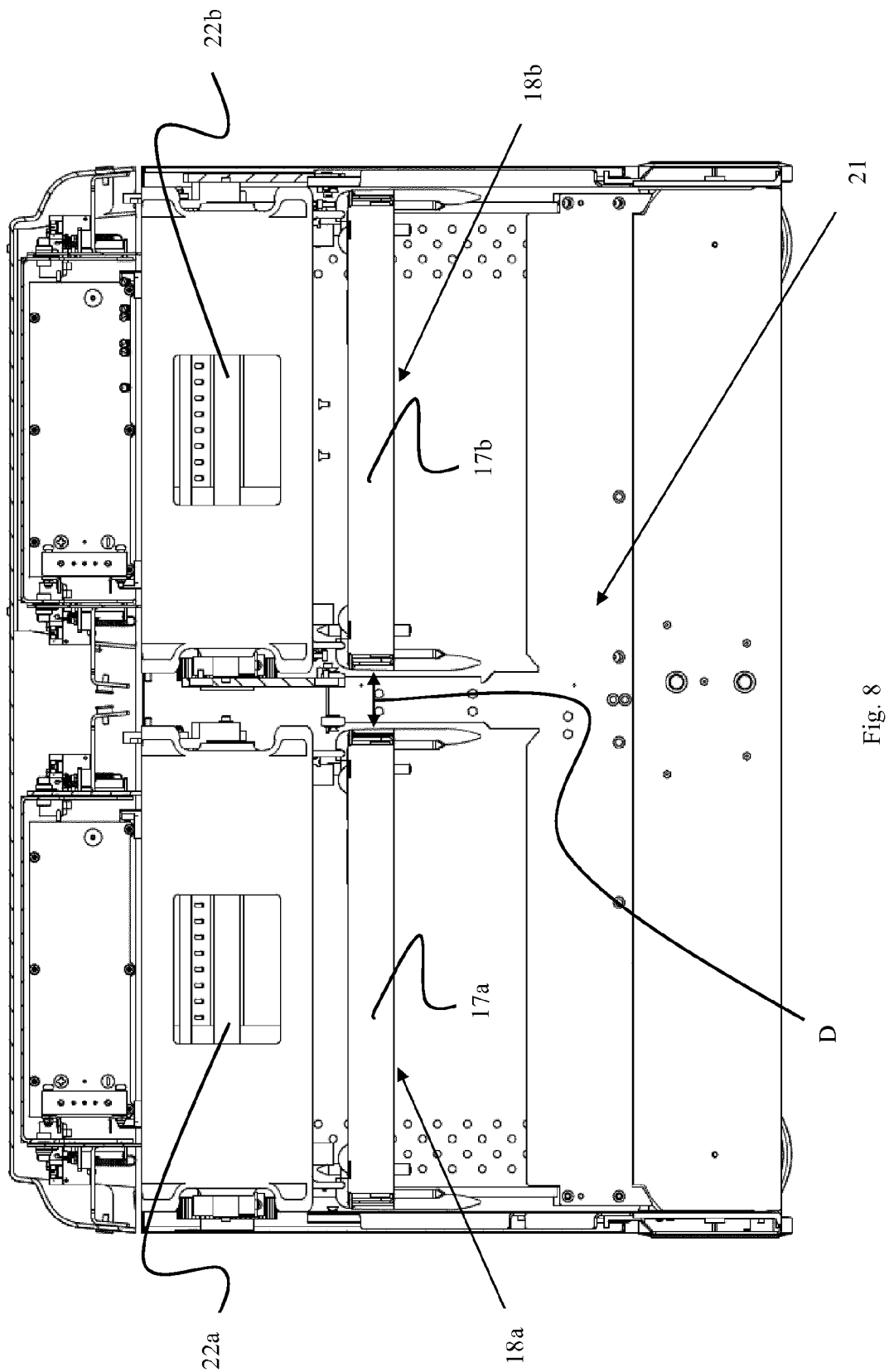
FIG. 8 is a cross-sectional view of the container-handling vehicle in FIG. 6 along A-A.
Figure 10:
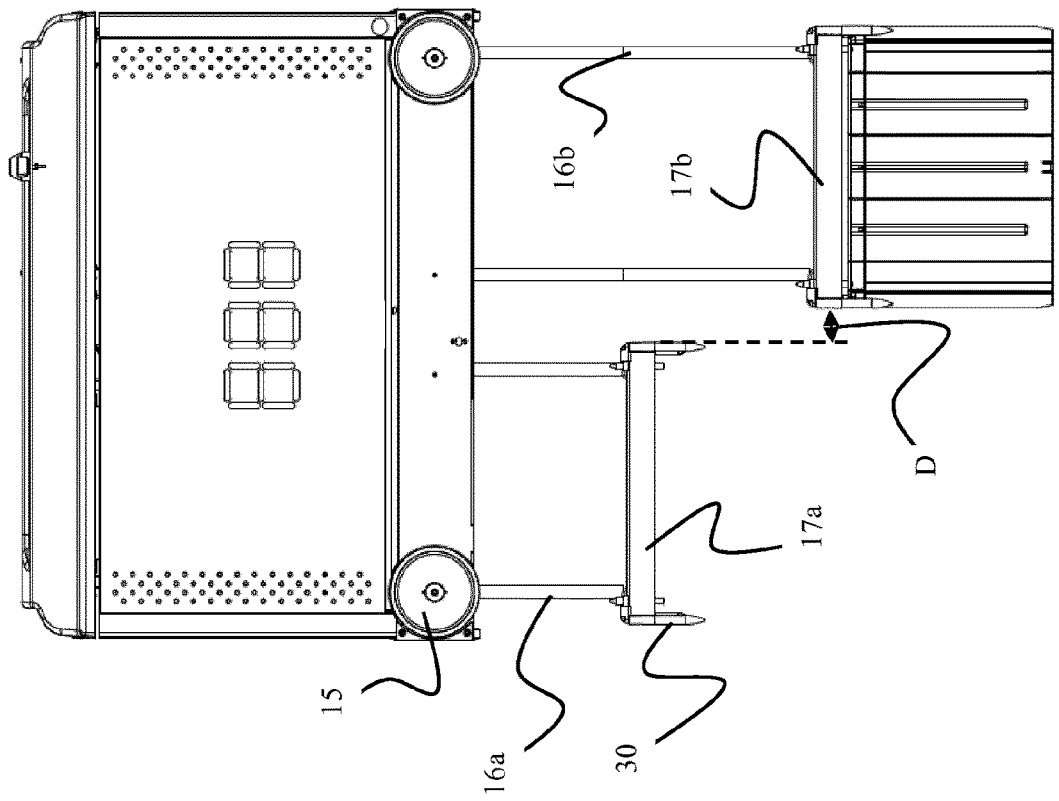
FIG. 10 is a side view of the container-handling vehicle in FIG. 9.
Figure 9:
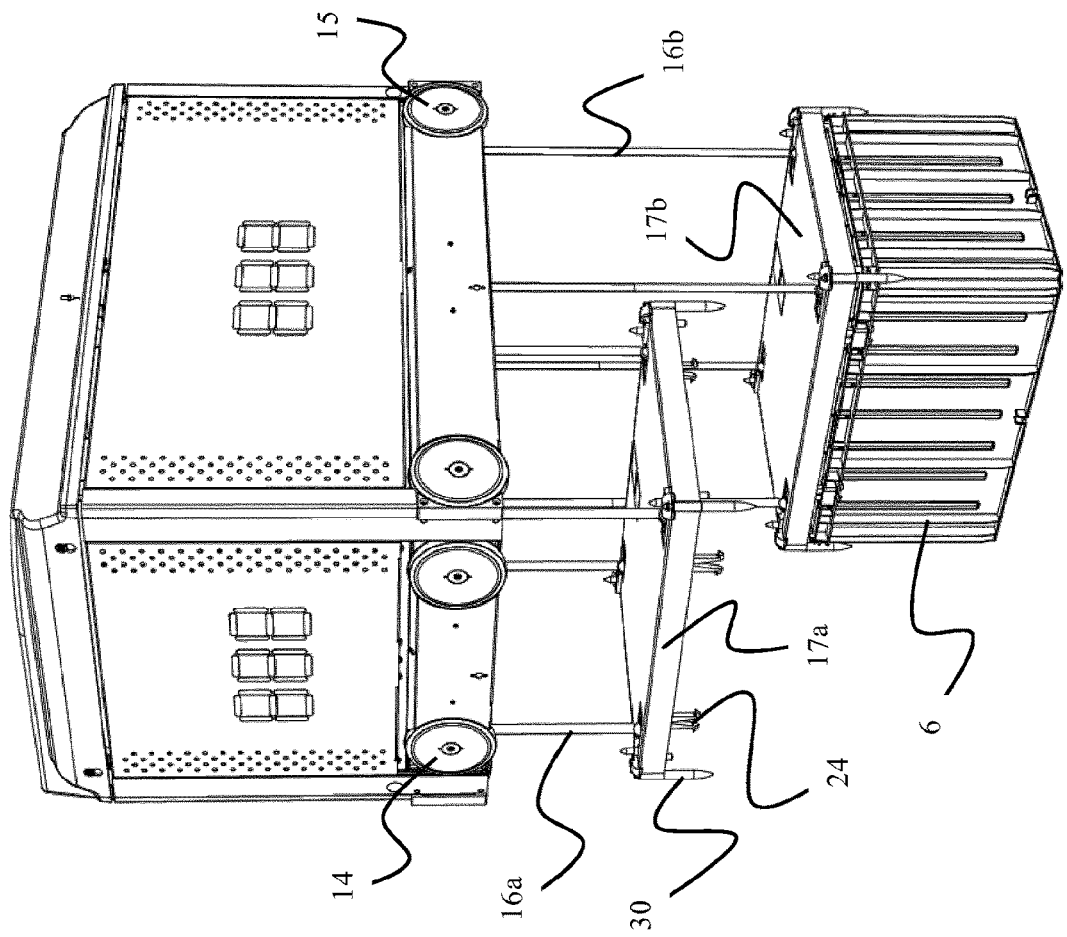
FIG. 9 is a perspective side view of the container-handling vehicle in FIG. 5, wherein the lifting devices extend out of the cavity.
Figure 11:
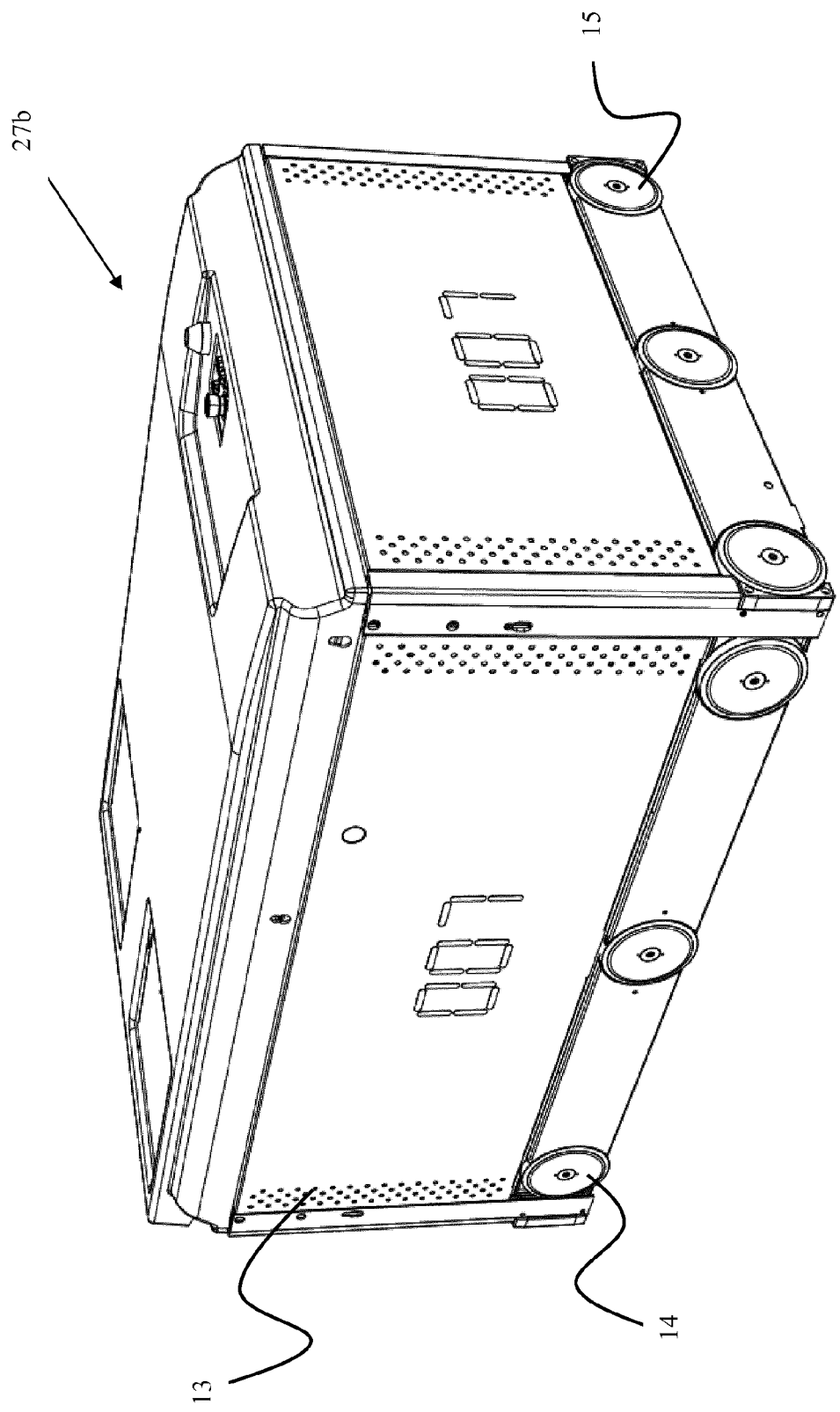
FIG. 11 is a perspective side view of a second exemplary embodiment of a container-handling vehicle according to the invention.

Each of the first and second lifting device includes a lifting frame 17a,17b connected to a corresponding rotatable lifting shaft 22a,22b via a set of lifting bands 16a,16b, see FIGS. 8-10. The lifting frame 17a,17b is provided with container connecting elements 24 for releasable connection to a storage container 6 and a guiding pin 30 at each corner of the lifting frame for ensuring a correct positioning of the container connecting elements 24 relative the storage container.

The rotatable lifting shafts 22a,22b are arranged above the cavity 21 at an internal upper level of the vehicle body 13. In all embodiments disclosed in the present specification, each of the lifting devices is connected, via four lifting bands, to a single corresponding lifting shaft. This particular design is advantageous in that few separate parts are required and it occupies a minimum of space providing a highly compact and light lifting shaft assembly. Although not as advantageous as the disclosed lifting shaft assembly, the inventive container-handling vehicles disclosed herein may alternatively comprise any other suitable lifting shaft assembly. Various suitable designs of rotatable lifting shafts and lifting shaft assemblies, and their connection to drive assemblies for providing rotation, as well as their connection to lifting bands are disclosed in for instance WO2015193278 A1 and WO2017129384 A1, the contents of which are incorporated by reference. In an alternative embodiment, the rotatable lifting shafts may for instance be driven by a common motor connecting the two shafts by a clutch arrangement allowing independent rotational control of the two lifting shafts.

Thus, the container-handling vehicle 27a of the present invention includes two adjacent lifting devices 18a,18b allowing for the simultaneous accommodation of two storage containers within the cavity 21. The lifting frames 17a,17b of the two lifting devices are horizontally separated by a distance D (see FIG. 10) being equal or larger than the width W of the rails system 10,11 arranged at the top end of the storage columns 5, see FIGS. 3, 4 and 8. In other words, the lifting devices 18a,18b are spaced such that the container-handling vehicle 27a may be arranged above two adjacent storage columns 5 while having one of the lifting frames 17a,17b centered relative to each of said storage columns.

By having two adjacent lifting devices, the container-handling vehicle 27a according to the invention provides an improved operational speed in various situations relative a prior art vehicle 9.

Several specific, but common, situations, wherein the container-handling vehicle 27a provides an improved operational speed or efficiency to the storage system are described below.

In an automated storage system 1, storage containers 6 containing high-turnover goods (in the following termed HT-containers) are often arranged at one of the uppermost levels of the storage columns 5 to increase the efficiency of the system. That is, HT-containers are usually arranged in the first or second layer (Z=1 or 2) of the grid 4, see FIG. 1 and description above.

For instance, due to the high turnover of the goods in the HT-containers, several HT-containers arranged in the first layer are often to be retrieved from the storage system at the same time. When two of these HT-containers are arranged in neighboring or closely positioned storage columns 5, the inventive container-handling vehicle 27a may retrieve both HT-containers before they are delivered to the port column 19. The efficiency of such an operation is greatly increased compared to a single prior art container-handling vehicle 9, which is required to move back and forth between the port column 19 for each HT-container to be retrieved. The same situation applies to HT-containers when returned to the storage columns.

In situations where the HT-container (or a first storage container) to be retrieved is arranged in the second layer, i.e., below a non-target container (or a second storage container), the efficiency may be improved even further. In such situations, the container-handling vehicle 27a may retrieve the non-target container arranged above the HT-container by use of the first lifting device 18a before retrieving the HT-container by use of the second lifting device 18b. Depending on which action is determined to be most efficient by a storage control system, the non-target container may be returned to the same storage column from which it was retrieved after retrieval of the HT-container, returned to (or stored in) an adjacent storage column while simultaneously retrieving the HT-container, returned to a suitable storage column during transport of the HT-container to the port column 19, or accommodated in the container-handling vehicle 27a while the HT-container is delivered to the port column 19.

Based on the description above, it follows that storage containers 6 containing low-turnover goods (in the following termed LT-containers) are often stored at the lower levels of a storage column. To retrieve LT-containers it is normally necessary to remove multiple storage containers (i.e., non-target containers) arranged above a targeted LT-container (i.e., a target container) before the LT-container may be retrieved. The container-handling vehicle 27a of the first exemplary embodiment is highly efficient in removing multiple non-target containers to allow access to the LT-container.

A second exemplary embodiment of a container-handling vehicle 27b according to the invention is shown in FIGS. 11-15.

The container-handling vehicle 27b in FIGS. 11-15 is particularly suited for removing multiple storage containers 6 (i.e., non-target containers) arranged above a target container stored at a lower level of a storage column, i.e., performing a digging operation. Consequently, the vehicle 27b is in the following referred to as a digger. The cavity of the digger features four separate lifting devices 17a-17d for independently lifting/lowering a total of four storage containers 6. Each of the lifting devices has the same features as described above for the first exemplary container-handling vehicle 27a. It should be understood that any number of separate lifting devices of such a digger is possible. In other exemplary embodiments of the digger there may be 3×2 lifting devices (i.e., two adjacent rows of 3 adjacent lifting devices), 4×2 lifting devices, 3×3 lifting devices or 4×4 lifting devices.

Figure 13:
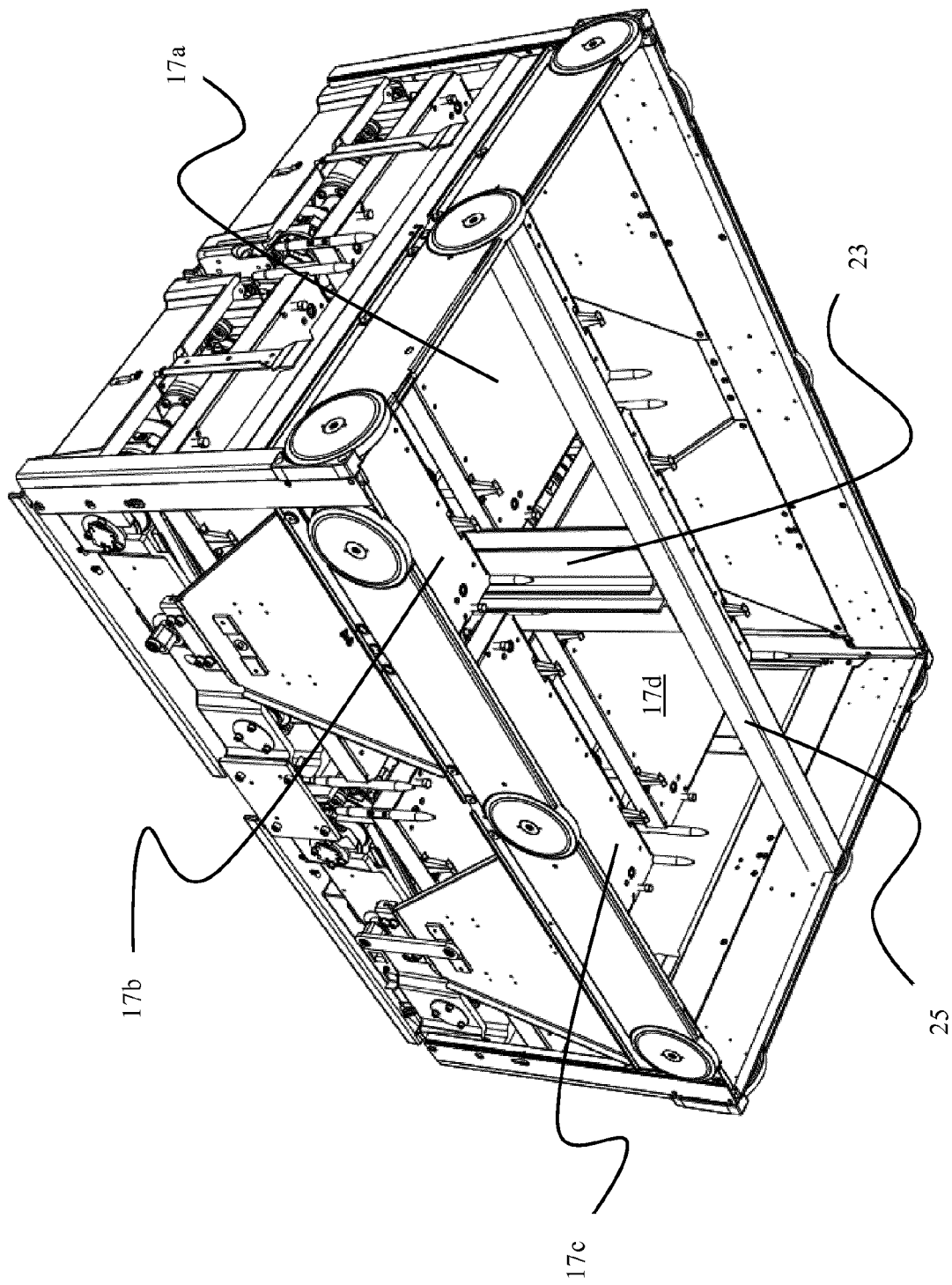
FIG. 13 is a perspective view of the container-handling vehicle in FIG. 11, shown from below.
Figure 14:
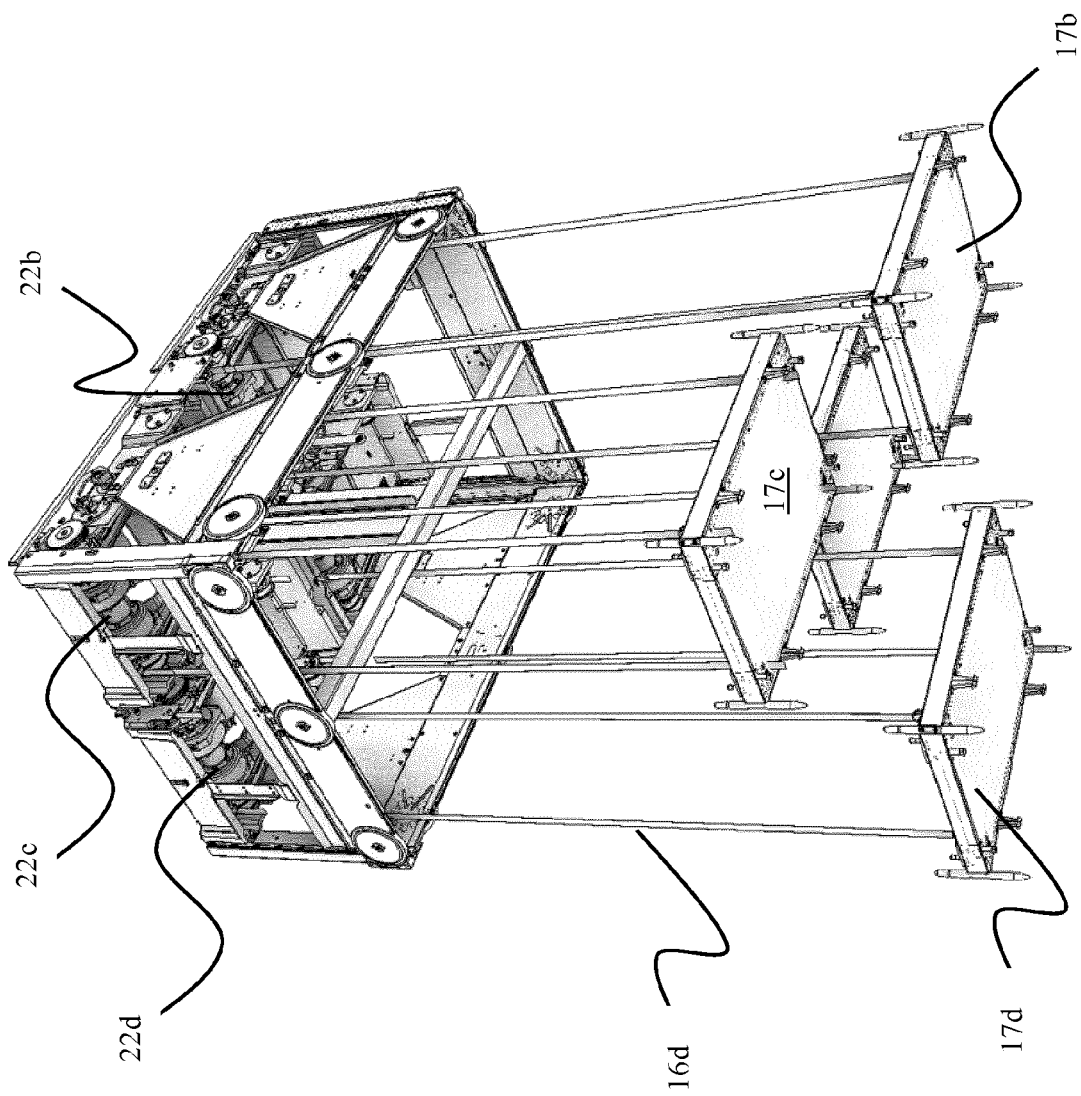
FIG. 14 shows the container-handling vehicle in FIG. 13, wherein the lifting frames are lowered.
Figure 15:
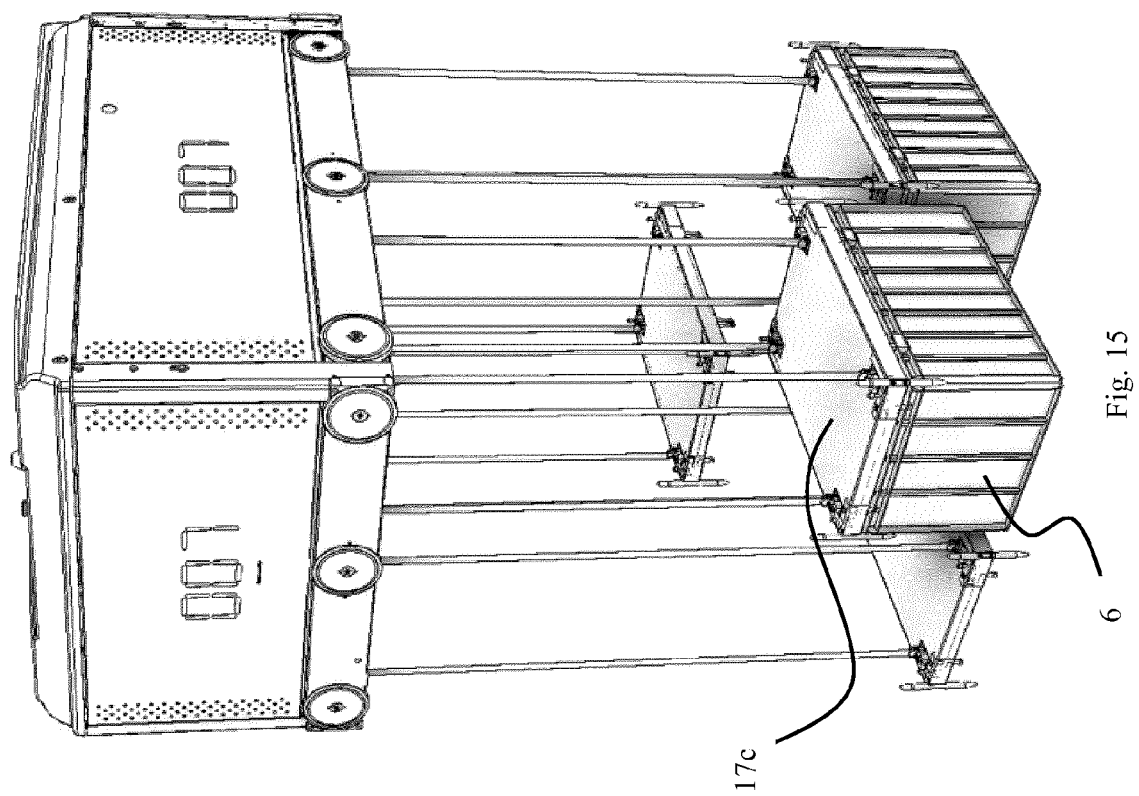
FIG. 15 shows the container-handling vehicle in FIG. 11, wherein the lifting frames are lowered.

To obtain a higher structural stability of the digger body 13, a support beam 25 may connect two opposite sides at the lower opening of the cavity as shown in FIG. 13. Such a support beam 25 should have a width smaller than the distance D separating two adjacent lifting frames.

The digger 27b includes a vertical frame guiding element 23 (i.e., a frame guide) arranged within the cavity 21. At least parts of the frame guiding element 23 is arranged between the lifting frames 17a-17d and restricts the lateral movement of the lifting frames and any storage container connected thereto. Restricting the lateral movement of the lifting frames are particularly important in a container-handling vehicle in which the lifting frames are independently controlled. Without the guiding element 23, adjacent lifting frames would have a substantial risk of interfering with each other during operation, especially when moving in opposite directions, i.e., when one lifting frame (e.g., 17a) is lifted and an adjacent lifting frame (i.e., 17b or 17d) is lowered. In addition to minimizing the risk of interference between adjacent lifting frames, the guiding element also increases the stability of the vehicle by restricting lateral movement of storage containers inside the cavity during acceleration of the vehicle. In this particular embodiment, the frame guiding element 23 is a longitudinal profile/beam having a substantially cross-shaped cross-section. The profile is at one end connected to an upper level of the cavity and the other end to the support beam. In this example, the frame guiding element is an integral part of the framework of the vehicle body. By being part of the framework, the frame guiding element also provides an increased structural stability to the vehicle body.

It is noted that the first exemplary embodiment 27a in FIGS. 5-10 is depicted without a frame guiding element 23. However, any container-handling vehicle according to the invention including more than two lifting devices, e.g., two adjacent lifting devices 17a, 17b, may advantageously comprise a vertical frame guiding element restricting the lateral movement of the lifting frames as discussed for the digger.

When used in a storage system as described above, the digger 27b may sequentially retrieve multiple non-target containers 6 from a storage column 5 (see FIG. 1) by performing the following steps when an LT-container (also termed a target container or first storage container) to be retrieved has been identified/selected:

In a first step, the digger is moved, such that one of the four lifting devices not currently lifting a storage container is centered relative a first storage column including the LT-container; and in a second step, a non-target container is retrieved/lifted by the lifting device centered relative the first storage column, the non-target container is arranged in the first storage column at a level above the LT-container.

The first and second step is then repeated until no non-target containers are at a level above the LT-container.

In case the number of non-target containers exceeds the number of lifting devices of the digger, i.e., more than four non-target containers in this particular example, the digger may perform a further step of storing a non-target container in a storage column other than the first storage column. To obtain an optimal efficiency the further step is preferably performed in a storage column adjacent to the first storage column and simultaneously with the second step.

When the LT-container is the uppermost container in the first storage column, that is, all non-target containers arranged above the LT-container have been removed, the LT-container may preferably be retrieved by another type of container-handling vehicle (i.e., a second type of container-handling vehicle) more suited for transporting the LT-container to for instance a port column of the storage system. The second type of container-handling vehicle may for instance be a prior art container-handling vehicle 9' as described above or similar.

Figure 16:
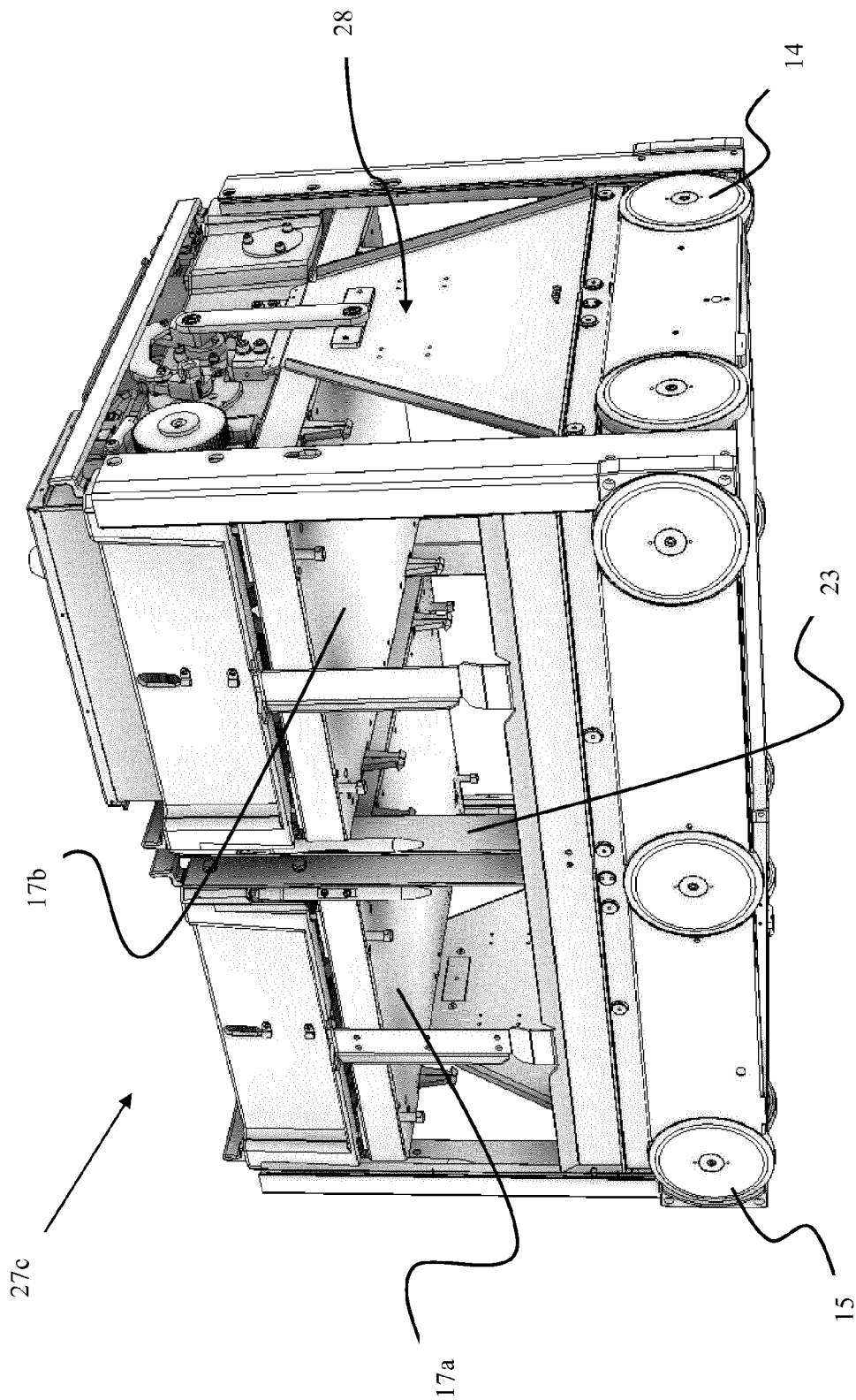
FIG. 16 is a perspective side view of a third exemplary embodiment of a container-handling vehicle according to the invention.

A third exemplary embodiment of a container-handling vehicle 27c according to the invention is shown in FIG. 16. The vehicle is substantially similar to the first embodiment, but differs in that it features a frame guiding element (alternatively termed a frame guiding assembly) including multiple vertical longitudinal plates 23 (alternatively ribs). The plates/ribs 23 are arranged on/at an internal side section of the cavity, in this example on two opposing internal side sections, and extend at least partly between the two lifting frames. In this example, similar to the second embodiment, the frame guiding element is an integral part of the framework of the vehicle body. By being part of the framework, the frame guiding element also provides an increased structural stability to the vehicle body. A further differentiating feature of the third embodiment is that the second set of wheels 15 includes three wheels, as opposed to two wheels in the first embodiment.

As disclosed above, both the second and the third embodiment features vertical frame guiding elements forming a part of the framework of the vehicle body. Although having the frame guiding element as a part of the framework provides an advantageous effect, i.e., providing increased structural stability, it is not a requirement.

In the first exemplary embodiment, the container-handling vehicle 27a features a cavity within which two rectangular storage containers may be accommodated having a long side of one storage containers adjacent to one of the long sides of the other. In other words, the lifting frames are rectangular, each frame having a first and second parallel and opposite sides. The first sides being longer than the second sides, and a first side of the first lifting frame is arranged adjacent to a first side of the second lifting frame. This is a preferred embodiment for a vehicle including only two lifting devices, or a vehicle including a multiple number of lifting devices arranged in line (X or Y direction), as this configuration makes it compatible with most prior art port columns 19 or storage container lifts (lifts for transporting containers into and out of a storage system). However, in other embodiments featuring only two lifting devices, or multiple number of lifting devices arranged in line, the cavity and lifting devices may be arranged such that the storage containers are arranged adjacent along their short sides.

REFERENCE NUMBERS

1 Framework structure/underlying storage system
2 Upright members/profiles
3 Horizontal members
4 Storage grid
5 Storage column
6 Storage container
7 Stacks
8 Rail system
9 Prior art container-handling vehicle
10 First set of parallel rails
11 Second set of parallel rails
12 Grid column
13 Vehicle body
14 First set of wheels
15 Second set of wheels
16 Lifting bands
17 Lifting frame
18 Lifting device
19 First port column
20 Second port column
21 Cavity
22 Lifting shaft
23 Vertical frame guiding element
24 Container connecting element
25 Support beam
26 Battery
27 Container-handling vehicle according to the invention
28 Wheel displacement assembly
30 Guiding pin

What is claimed is:

1. A container-handling vehicle for picking up storage containers from a three-dimensional grid of an underlying storage system, comprising:
   a vehicle body and wheels for moving the vehicle in two perpendicular directions on the grid;
   the vehicle body surrounds a cavity within which at least a first lifting device and a second lifting device are positioned adjacent to each other, each lifting device comprising a lifting frame, each lifting device is independently controlled and arranged to lift a storage container from the grid and into the cavity, and
   the vehicle comprises at least one vertical frame guiding element arranged inside the cavity, the frame guiding element extending between the lifting devices,
   wherein the at least one vertical frame guiding element defines at least portions of a vertically extending corner section providing guidance to an external corner of one of the lifting frames,
   wherein the at least one vertical frame guiding element partitions the cavity into two or more storage areas where each storage area has an independent lifting device.

2. The container-handling vehicle according to claim 1, wherein the first lifting device and the second lifting device are adjacent, such that the container-handling vehicle may accommodate two adjacent storage containers within the cavity.

3. The container-handling vehicle according to claim 1, wherein each of the first lifting device and the second lifting device is connected to at least one first rotatable lifting shaft and at least one second rotatable lifting shaft, respectively.

4. The container-handling vehicle according to claim 1, wherein the lifting frame of each of the first lifting device and the second lifting device is for releasably connecting to a container.

5. An automated storage and retrieval system comprising a three-dimensional grid and at least one container-handling vehicle according to claim 1,
   wherein the grid comprises multiple storage columns, in which storage containers may be stored on top of one another in vertical stacks, and a port column for receiving and transporting a storage container to an access station;
   wherein the container handling vehicle is operated on rails at a top level of the grid for retrieving storage containers from, and storing storage containers in, the storage columns, and for transporting the storage containers horizontally across the grid; and
   wherein the first lifting device and the second lifting device are arranged such that they may enter two adjacent storage columns at the same time.

6. The automated storage and retrieval system according to claim 5, wherein each of the lifting devices are arranged such that the respective lifting frames may enter two adjacent storage columns at the same time.

7. The automated storage and retrieval system according to claim 6, wherein the lifting frames of the first lifting device and the second lifting device are horizontally separated by a distance being larger than the width of the rails separating two adjacent storage columns.

8. The automated storage and retrieval system according to claim 6, wherein the container-handling vehicle has a horizontal periphery equal to, or less than, the horizontal periphery of a set of rails surrounding two adjacent storage columns.

9. The automated storage and retrieval system according to claim 6, wherein each of the first and second lifting frames comprises container connecting elements for releasable connection to corresponding lifting frame connecting elements on the storage containers, and guiding pins for ensuring a correct positioning of the container connecting elements.

10. A method of retrieving at least one storage container from an automated storage and retrieval system comprising a three-dimensional grid and at least one container-handling vehicle,
   wherein the grid comprises multiple storage columns, in which storage containers may be stored on top of one another in vertical stacks, and a port column for receiving and transporting a storage container to an access station;
   wherein the container handling vehicle is operated on rails at a top level of the grid for retrieving storage containers from, and storing storage containers in, the storage columns, and for transporting the storage containers horizontally across the grid;
   wherein the container-handling vehicle comprises at least a first lifting device and a second lifting device, each lifting device comprising a lifting frame, the lifting devices arranged such that they may retrieve and/or store a storage container from/in at least two adjacent storage columns at the same time, and at least one vertical frame guiding element extending between the first lifting device and the second lifting device;
   wherein the at least one vertical frame guiding element defines at least portions of a vertically extending corner section providing guidance to an external corner of one of the lifting frames;
   wherein the at least one vertical frame guiding element partitions the cavity into two or more storage areas where each storage area has an independent lifting device; and
   the method comprising:

identifying a first storage container to be retrieved;

moving the container-handling vehicle, such that the first lifting device is centred relative a first storage column comprising the first storage container;

retrieving a second storage container by the first lifting device, the second storage container arranged in the first storage column at a level above the first storage container;

moving the container-handling vehicle, such that the second lifting device is centred relative the first storage column; and retrieving the first storage container by the second lifting device.

11. The method according to claim 10, further comprising:

moving the container-handling vehicle along a pathway to the port column.

12. The method according to claim 10, further comprising:

storing the second storage container in a second storage column adjacent to the first storage column, simultaneously with the step of retrieving the first container; or returning the second storage container to the first storage column when the first storage container has been retrieved; or storing the second storage container in a third storage column when the first storage container has been retrieved, the third column preferably arranged along the pathway to the port column.

* * * * *